Nov. 17, 1959   J. DAZZI   2,913,499
CHLORO-ETHERS
Filed Nov. 30, 1955
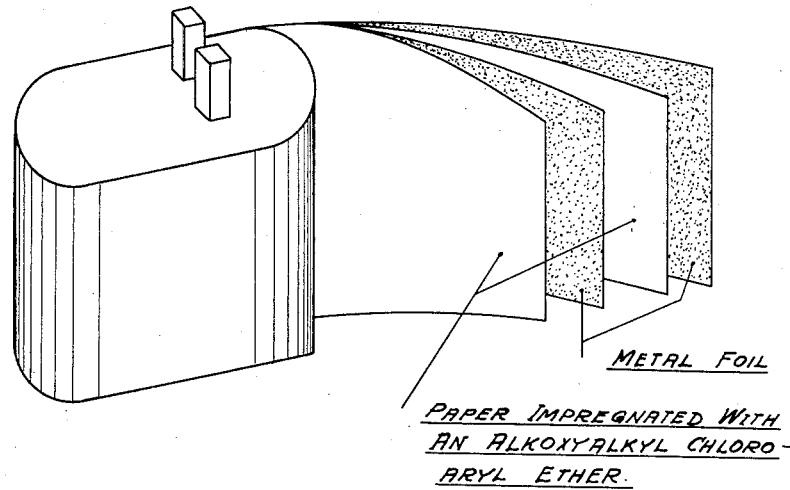
INVENTOR.
JOACHIM DAZZI
BY
ATTY.

2,913,499
CHLORO-ETHERS

Joachim Dazzi, Dayton, Ohio, assignor to Monsanto Chemical Company, St. Louis, Mo., a corporation of Delaware Application November 30, 1955, Serial No. 550,239

3 Claims. (Cl. 260—613)

The present invention relates to chlorine-containing ethers and more particularly provides certain hitherto unknown alkoxyalkyl chloroaryl ethers, the method of preparing the same, and dielectric compositions comprising said ethers.

According to the invention new and valuable ethers are provided by the reaction of a chlorine-substituted benzene or alkylbenzene having from 2 to 5 chlorine atoms in the aromatic ring and an alkoxyalkanol substantially according to the scheme:

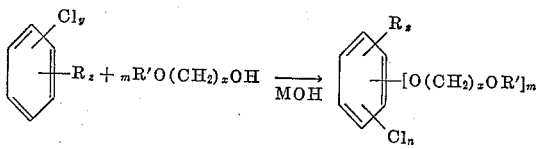

in which R is an alkyl radical of from 1 to 5 carbon atoms, $y$ is an integer of from 2 to 5, $z$ is an integer of from 0 to 4, $m$ is an integer of from 1 to 2, R' is an alkyl radical of from 1 to 8 carbon atoms, $x$ is an integer of from 2 to 4, M is alkali metal, and $n$ is an integer of from 1 to 4.

The present condensation reaction involves replacement of one or two of the nuclear chlorine atoms of the chlorinated hydrocarbon, so that in defining the process, the sum of $m+n$ equals the total number of chlorine atoms $y$ present in the chlorinated hydrocarbon. Chlorine-substituted benzenes or ar-chlorine-substituted alkylbenzenes having the above formula are, for example, ortho-, meta- or para-dichlorobenzene, 2,3-, 3,4-, 2,4-, 2,6-, 2,5- or 3,5-dichlorotoluene, 2,3-dichloro-p-xylene, 4,5-dichloro-m-xylene, 2,3,4-trichloro-n-butylbenzene, ar-tetrachloro-tert-amylbenzene, pentachlorobenzene, 1,3,5-, 1,2,3- or 1,3,4-trichlorobenzene, 1,2,4,5- or 1,2,3,5 - tetrachlorobenzene, 3,6 - dichloro - 1,2,4,5-tetra-ethylbenzene, ar-dichloro-p-cymene, ar-dichloro-ar-tert-butyl-m-xylene, ar-dichloro-ar-isobutylmesitylene, ar-trichloro-1,4-dibutylbenzene, etc. Alkoxyalkanols which are reacted with the chlorinated benzenes or the chlorinated alkylbenzenes according to the invention are those having 1 to 8 carbon atoms in the alkoxy radical and from 2 to 4 carbon atoms in the alkanol portion of the molecule, e.g., 2-methoxyethanol, 2-butoxyethanol, 3-ethoxypropanol, 2-ethoxyethanol, 2-amyloxyethanol, 4-ethoxybutanol, 3-methoxypropanol, 3-amyloxypropanol, 2-octyloxyethanol, 2-isopropoxyethanol, 3-hexyloxypropanol.

Reaction of the chlorine-substituted benzenoid compounds with the alkoxyalkanols to give the present alkoxyalkyl chloroaryl ethers takes place readily by heating the two reactants in the presence of an alkali metal hydroxide, i.e., sodium, potassium or lithium hydroxide, at a temperature of from, say, 150° C. to 280° C. at ordinary atmospheric or increased pressure until formation of the ethers has taken place. Since the reaction may result in the replacement of more than one chlorine atom by the alkoxyalkoxy radical, when desiring a preponderance of the substitution of only one chlorine atom by the alkoxyalkoxy group, it is generally advisable to use a large excess of the chlorinated benzenoid compound. On the other hand, when the major product to be obtained is the diether, an excess of the alkoxyalkanol is advantageously used. The quantity of alkali metal hydroxide employed is also somewhat controlling in the type of product obtained. Hydrogen chloride is liberated in the replacement of the nuclear chlorine by the alkoxyalkoxy moiety of the alkoxyalkanol; and in order to obtain good yields of either the mono-ether or the di-ether, there should be present in the reaction mixture enough of the alkali to neutralize the liberated acid. Usually from one to two moles of the alkali metal hydroxide per mole of the alkoxyalkanol is used. An excess of sodium hydroxide is not detrimental to the reaction, whereas a quantity which is substantially less than that of the alkoxyalkanol on a molar basis is conducive to lower yields of ether product.

The reaction time and temperature appears to have little, if any, effect on the nature of the ether product. Although a primarily formed mono-ether will react with another mole of alkoxyalkanol to yield a diether, higher temperatures and/or continued heating alone do not suffice in effecting substantial conversion to the diether. An excess of the alkoxyalkanol over that required for replacement of one chlorine atom should be present in order to obtain any substantial formation of the diether. Whether the reactant quantities present are those which favor mono-substitution (excess of chlorinated hydrocarbon) or whether the proportions are such as to favor di-substitution (excess of alkoxyalkanol), ether formation occurs after heating at a temperature of from 130° C. to 280° C. and preferably of from 160° C.–210° C. or 250° C. for a time of, say, several hours to a day. The progress of the reaction can be generally followed by noting the refractive index of the reaction mixture or by noting the quantity of water being formed as the liberated hydrogen chloride is neutralized by the sodium hydroxide. While provision for removal of water during the reaction is not required, better yields of ether product and a ready means of determining reaction rate are afforded by operating in a reaction vessel which is equipped with some water-removing facility, e.g., a water trap or take-off head.

Although, as above stated, reaction of the chlorinated benzenoid compound and the alkoxyalkanol can be so directed as to result in a preponderance of either mono- or di-ether formation, generally the product contains mixture of the two in varying proportions.

A class of particularly valuable ethers provided by the present invention are the mono-ethers prepared from ortho-, meta- and para-dichlorobenzene and an alkoxyalkanol of the formula R'O(CH$_2$)$_x$OH wherein R' is an alkyl radical of from 1 to 8 carbon atoms and $x$ is an integer of from 2 to 4. Thus from ortho-dichlorobenzene and 2-n-propoxyethanol there is obtained 2-chlorophenyl 2-n-propoxyethyl ether; from para-dichlorobenzene and 4-butoxybutanol there is obtained 4-butoxy-butyl 4-chlorophenyl ether; from meta-dichlorobenzene and 2-methoxyethanol there is obtained 3-chlorophenyl 2-methoxyethyl ether; and from ortho-dichlorobenzene and 2-ethoxyethanol there is obtained 2-chlorophenyl 2-ethoxyethyl ether. These are formed according to the reaction

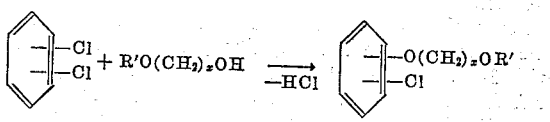

Varying quantities of by-product chlorine-free di-ether may also be formed in the reaction, depending upon the reactant proportions, thus:

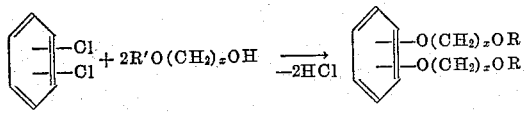

The chlorine-free di-ether is easily separated from the chlorine-containing mono-ether by fractional distillation. As will be hereinafter shown, the alkoxyalkyl chlorophenyl ethers are characterized by properties which recommend them for use as liquid dielectrics.

Another valuable class of ethers provided by the invention are those obtained from a trichlorobenzene and said alkoxyalkanols. These may be represented by the formula

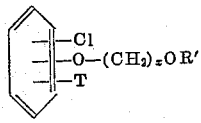

in which T is selected from the class consisting of chlorine and the radical O—$(CH_2)_xOR'$ wherein $x$ denotes an integer of from 2 to 4 and R' is an alkyl radical of from 1 to 8 carbon atoms. The mono-ethers, which are obtained by using a large excess of the trichlorobenzene with the alkoxyalkanol, have the formula

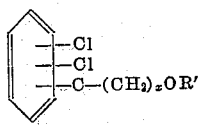

They may be broadly referred to as alkoxyalkyl dichlorophenyl ethers having from 1 to 8 carbon atoms in the alkoxy radical and from 2 to 4 carbon atoms in the alkyl radical. Examples of such presently provided monoethers are 2-butoxyethyl 2,3-dichlorophenyl ether; 2-4-dichlorophenyl 2-methoxyethyl ether; 2,6-dichlorophenyl 3-ethoxypropyl ether; 2,5-dichlorophenyl 4-propoxybutyl ether, etc. Examples of di-ethers provided by the present invention from the trichlorobenzenes are, e.g., 2,3-bis-(2 - ethoxy - ethoxy)chlorobenzene; 2,5 - bis(2 - amyloxyethoxy)chlorobenzene; 2,4-bis(4-methoxybutoxy)chlorobenzene, 3,5 - bis(3 - isopropoxypropoxy)chlorobenzene, etc. The monethers and the diethers are readily separable by fractional distillation, but since both possess dielectric properties, the isolation procedure may be frequently omitted when these compounds are to be used in this field.

The tetrachlorobenzenes similarly react with the alkoxyalkanols to give the mono-ethers:

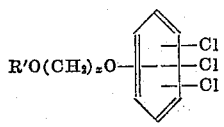

and the di-ethers

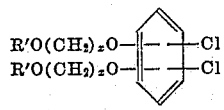

From 1,2,3,4-tetrachlorobenzene and, e.g., 2-methoxyethanol there is obtained 2-methoxyethyl 2,3,4-trichlorophenyl ether as the mono-ether product and 1,2-bis(2-methoxyethoxy)-3,4-dichlorobenzene as the di-ether product.

Pentachlorobenzene likewise undergoes replacement of one or two chlorine atoms by alkoxyalkoxy groups. Thus, with 3-ethoxypropanol there is obtained 3-ethoxypropyl tetrachlorophenyl ether as the mono-ether product and ar-bis(3-ethoxypropoxy)trichlorobenzene as the di-ether product.

I have also found that the presence of an alkyl radical attached to the aromatic ring of the chlorinated hydrocarbon component does not detract from the ease with which replacement of the nuclear chlorine by the alkoxyalkoxy radical takes place. The dichlorobenzene may be substituted by from 1 to 4 alkyl radicals; the trichlorobenzene with 1 to 3 alkyl radicals, etc. Thus, from 2,3-dichloroethylbenzene and 2-ethoxy-ethanol there is obtained ortho-chloroethylphenyl 2-ethoxyethyl ether and 2,3 - bis(2-ethoxyethoxy)ethylbenzene as by - product. From ar-amyl-ar-trichlorobenzene and 4-methoxybutanol there is obtained ar-amyl-ar-dichlorophenyl 4-methoxybutyl ether as the mono-ether product and ar-amyl-ar-bis-(4-methoxybutoxy)-ar-chlorobenzene as the di-ether product. From ar-isopropyl-ar-tetrachlorobenzene and 2-butoxyethanol there is similarly obtained ar-bis(2-butoxyethoxy)-ar-dichloro-ar-isopropylbenzene. From the polyalkylated ar-dichloro-ar-triethylbenzene and 4-ethoxy-butanol there is obtained the mono-ether product ar-chloroar-triethylphenyl 4-ethoxybutyl ether.

The present chloro ethers are stable, rather high-boiling compounds which are useful for a variety of industrial and agricultural purposes, but which are particularly valuable as liquid dielectric compositions. They are advantageously employed as liquid impregnants in capacitor and cable manufacture, as transformer coolants and in the fabrication of switch gear.

Characteristics of the present chloro-ethers are such as to render them particularly valuable as impregnants for cellulosic insulating materials. It is known in the art that impregnation of cellulosic materials, e.g., wood pulp paper, cotton, cotton fabric, cellulose acetate fibers and textiles, by certain liquid dielectrics provides an insulating material which has a dielectric constant which is much higher than that of either the cellulosic material before impregnation or of the liquid dielectric. Some of the first liquids used for this purpose were mineral oils, the dielectric strength of oil-impregnated paper having been reported by Bailey (Radio Engineering, 17, 17, 35 (1937)) to be 15 times as high as that of the oil alone. However, because mineral oils are readily oxidized, their usefulness as insulating media and as impregnating agents for cellulosic materials has been limited in that exposure to air, sunlight or moisture often leads to gas formation, gaseous ionization and formation of wax. These changes affect power factor stability.

Although wood pulp paper, alone, has good insulating properties, it is also affected by exposure to air, particularly at higher temperatures. While the rate of mechanical deterioration is reduced by impregnating the insulation with oil, this was of little advantage as noted above. Accordingly, the art resorted to other impregnating agents, particularly the highly chlorinated aromatic hydrocarbons. These materials have dielectric strengths which are higher than those of the mineral oils. In addition, they are non-flammable and more stable to the influence of air, moisture and light. However, their general utility has been somewhat hampered in that under high operating temperatures and voltages decomposition of said highly chlorinated hydrocarbons is manifested. Hydrogen chloride is evolved; and this attacks not only the paper which had been impregnated, but also the metal portions of the capacitor.

The presently provided alkoxyalkyl chloroaryl ethers are high-boiling materials which possess high resistivities and low power factors. Their stability to high temperatures is evidenced by little or no change in power factor readings after heating for 24 hours at 100° C. Their stability is further illustrated by continued high resistivities, which indicates freedom from conducting ions which would be present if decomposition of the ethers occurred. The present ethers remain liquid at low temperatures, whereby there is avoided a decrease in dielectric constant due to freezing of the dipoles.

The above characteristics thus speak for eminent suitability of the alkoxyalkyl chloroaryl ethers as impregnating agents for cellulosic materials, and an embodiment of the present invention is the provision of improved cellulosic insulating agents comprising porous materials derived from cellulose, e.g., pulps, fibers, textiles or papers derived from wood, cotton or linen, which porous products have been impregnated with the present alkoxyalkyl chloroaryl ethers. A noteworthy feature of the present invention is the provision of a capacitor comprising a pair of electrodes and an insulating agent associated with each of the electrodes and isolating them from each other, said insulating agent comprising a cellulosic material impregnated with the present ethers.

In order to more particularly describe this feature of the invention, details of the construction of a paper capacitor are set forth here by way of illustration:

Three sheets of tissue paper (preferably kraft capacitor tissue) are stacked upon each other, and a thin aluminum foil (about 0.0003" in thickness) is laid on the top sheet of tissue. The foil is then covered with three more sheets of the tissue and another sheet of the foil is placed thereon so that the two sheets of metal foil are separated from each other by the tissues. On the second metal sheet there are stacked three more sheets of said tissue and the stack of alternating layers of metal foil and tissues thus obtained is wound into a cylindrical roll. This is placed in a container, and at this point electrical connecting means, e.g., wire or bar conductors, depending upon the size of the assembly, may be connected to the metal foil in known manner. After drying, preferably in a heated vacuum oven, one or more of the present alkoxyalkyl chloroaryl ethers is added to the container in a quantity sufficient to impregnate thoroughly the paper content thereof. The container is then sealed.

Alternatively, and particularly in the manufacture of small resistors which for the sake of economy are housed in paper tubes rather than in leak-proof containers, the tissue paper is impregnated with the alkoxyalkyl chloroaryl ethers previous to interleaving with the metal foil in the manner described above.

The invention is further illustrated but not limited by the following examples:

EXAMPLE 1

A mixture consisting of 2 moles (294 g.) of ortho-dichlorobenzene, 3 moles (354 g.) of 2-butoxyethanol, 2.5 moles (100 g.) of sodium hydroxide and 140 ml. of toluene was brought to a temperature of 140° C. within a period of 45 minutes, and then maintained at a temperature of from 140° C. to 175° C. for 6 hours. During this period 50.0 ml. of water was collected in a Dean-Stark water trap carried on a condenser with which the reaction vessel was equipped. The cooled reaction mixture was diluted with 400 ml. of ether and washed neutral with a dilute hydrochloric acid. Distillation of the washed material gave 250 g. of a fraction B.P. 60–100° C. at 20 mm., the chlorine analysis of which showed it to be essentially dichlorobenzene; and 257.2 g. of the substantially pure 2-butoxyethyl 2-chlorophenyl ether B.P. 126–130° C./2 mm., $n_D^{25}$ 1.5022 and analyzing as follows:

| Found | Calcd. for $C_{12}H_{17}O_2Cl$ |
|---|---|
| Percent C ........................................ 63.25 | 63.00 |
| Percent H ........................................ 7.58 | 7.45 |
| Percent Cl ....................................... 15.35 | 15.57 |

Based on the recovered dichlorobenzene the yield of 2-butoxyethyl 2-chlorophenyl ether obtained represents approximately 82% conversion of the dichlorobenzene to said ether.

The 2-butoxyethyl 2-chlorophenyl ether thus obtained was found to have a volume resistivity of $33 \times 10^9$ ohm-cm. at 100° C., a pour-point of minus 70° C., and the following dielectric constant and power factor values at the frequencies and temperatures noted below:

| Test Frequency | Dielectric Constant | | | Power Factor | | |
|---|---|---|---|---|---|---|
| | −25° C. | 25° C. | 100° C. | −25° C. | 25° C. | 100° C. |
| | | | | Percent | Percent | Percent |
| 10 kc | 9.58 | 7.45 | 5.77 | 0.1 | 0.16 | 0.3 |
| 100 kc | 9.60 | 7.47 | 5.80 | 0.0 | 0.0 | 0.0 |

The low power factor values at both test frequencies and at the three test temperatures show very good stability of the 2-butoxyethyl 2-chlorophenyl ether. Paper capacitors in which the present ether is employed for impregnating the paper are particularly useful in high-altitude aircraft in that they may be used without freezing of the dipoles at temperatures which approximate the very low pour-point of this ether.

EXAMPLE 2

This example shows the use of an excess of ortho-dichlorobenzene in the preparation of 2-butoxyethyl 2-chlorophenyl ether from ortho-dichlorobenzene and 2-butoxyethanol. Into a reaction vessel equipped with stirrer and a column carrying a Dean-Stark trap there was charged 1.5 moles (177 g.) of 2-butoxyethanol, 4.5 moles (661.5 g.) of ortho-dichlorobenzene, 1.8 moles of sodium hydroxide and 200 ml. of xylene. Heating of the charge at a temperature of 150° C. to 190° C. for 9 hours resulted in collection of about 27 ml. of water in the Dean-Stark trap. After allowing the reaction mixture to cool it was diluted with about 200 ml. of water, neutralized with 33 ml. of concentrated hydrochloric acid (equal to 0.38 mole of HCl) and finally washed with water. The aqueous layer was extracted with ether and the ether extract was distilled to give 341 g. of a fraction B.P. 75–80° C./25 mm. which comprised unreacted dichlorobenzene and 253 g. of the substantially pure 2-butoxyethyl 2-chlorophenyl ether B.P. 120–5° C./1 mm., $n_D^{25}$ 1.5022 based on the recovered dichlorobenzene. The quantity of said ether obtained represents a 74% conversion of the dichlorobenzene consumed in the reaction.

EXAMPLE 3

This example describes the reaction of para-dichlorobenzene with 2-butoxyethanol. A mixture consisting of 294 g. (2 moles) of the dichlorobenzene, 354 g. (3 moles) of the butoxy ethanol, 185 g. (3.3 moles) of potassium hydroxide, and 100 ml. of toluene was charged to a flask equipped with a stirrer, thermometer and column bearing a head for take-off of the distillate. It was heated at a temperature of from 154–168° C. for about 8 hours during which time 76 ml. of water was collected. The reaction mixture was then refluxed with 1500 ml. of water and 100 ml. of toluene for one hour. It was then allowed to cool and acidified with 30 ml. of concentrated hydrochloric acid. It was then filtered and the residue was washed with water and treated with alcohol in order to affect stratification. The organic layer which formed was separated and distilled first at a pressure of 25–30 mm. of Hg to remove water and then to obtain 133 g. of the substantially pure 2-butoxyethyl parachlorophenyl ether B.P. 170–180° C./25–30 mm. $n_D^{25}$ 1.5028 and analyzing as follows:

| | Found | Calcd. for $C_{14}H_{17}ClO_2$ |
|---|---|---|
| Percent C | 63.57 | 63.01 |
| Percent H | 7.37 | 7.49 |
| Percent Cl | 14.78 | 15.50 |

EXAMPLE 4

Into a 3-liter flask equipped with a stirrer and a column which carried a Dean-Stark trap there were charged 6.1 moles (708 g.) of 2-butoxyethanol, 6.25 moles (254 g.) sodium hydroxide, 8 moles (1451.2 g.) of 1,2,4-trichlorobenzene and 200 ml. of toluene. The temperature of the reaction mixture was brought to 153° C. within about 1 hour at the end of which period the collection of water was noted in the trap. Heating was continued at a temperature of from 153° C. to 180° C. for about 3 hours during which time a total of about 112 ml. of water was collected. At this point an additional 0.25 mole of the 2-butoxyethanol was added and heating was continued for another 11 hours at a temperature of from 180° C. to 240° C. After being allowed to cool to room temperature the reaction mixture was acidified by addition of 50 ml. of concentrated hydrochloric acid. It was then diluted with 1250 ml. of water and allowed to stratify. The organic layer which separated was washed 4 times with 100 cc. portions of dilute sodium hydroxide, several times with water and finally with brine. The washed product was heated to 45° C./22 mm. to remove water. Further distillation gave 1000 g. of the substantially pure 2-n-butoxyethyl dichlorophenyl ether. B.P. 117–131° C./20–22 mm. and 20.1 g. of bis(2-n-butoxyethyl)chlorobenzene B.P. 164–173° C./20–22 mm. A fraction, B.P. 117–120° C./20–22 mm., $n_D^{25}$ 1.5160 analyzed as follows:

|  | Found | Calcd. for $C_{12}H_{16}Cl_2O_2$ |
|---|---|---|
| Percent C | 54.71 | 54.77 |
| Percent H | 6.27 | 6.13 |
| Percent Cl | 26.83 | 26.95 |

The diether, B.P. 164° C.–173° C./20–22 mm. analyzed as follows:

|  | Found | Calcd. for $C_{18}H_{29}ClO_4$ |
|---|---|---|
| Percent C | 61.58 | 62.68 |
| Percent H | 7.32 | 8.48 |
| Percent Cl | 12.42 | 10.28 |

EXAMPLE 5

This example describes the reaction of 2,4-dichlorotoluene with 2-butoxyethanol. To a 4-neck, 3-liter flask equipped with a stirrer, thermometer and column bearing a take-off head there was charged 2 moles (322 g.) of 2,4-dichlorotoluene, 3 moles (354 g.) of 2-butoxyethanol ("Butyl Cellosolve"), 3 moles (185 g.) of potassium hydroxide and 100 ml. of toluene. The mixture was heated with stirring for about 8 hours at a temperature of from 160–168° C., during which time 71 ml. of water was collected. At the end of the heating period 1500 ml. of water was added to the mixture with stirring and the whole was acidified with 100 ml. of concentrated hydrochloric acid. Filtration of the acidified mixture gave a filtrate from which the organic layer was separated and water-washed. After removing the water by heating to 65° C./40 mm., the remaining material was distilled to give 149 g. of the substantially pure (I) 2-butoxyethyl ar-chlorotolyl ether B.P. 170–185° C./20–25 mm. $n_D^{25}$ 1.5023 which analyzed as shown below; and 59 g. of (II) bis(butoxyethoxy)-toluene B.P. 220–240° C./0.2–0.3 mm. $n_D^{25}$ 1.5006 analyzing as shown below.

*Analysis—I*

|  | Found | Calcd. for $C_{13}H_{19}O_2Cl$ |
|---|---|---|
| Percent C | 65.81 | 64.32 |
| Percent H | 8.50 | 7.89 |
| Percent Cl | 13.68 | 14.61 |

*Analysis—II*

|  | Found | Calcd. for $C_{19}H_{32}O_4$ |
|---|---|---|
| Percent C | 69.81 | 70.33 |
| Percent H | 9.28 | 9.44 |

EXAMPLE 6

This example describes the reaction of 3,4-dichlorotoluene with 2-butoxyethanol ("Butyl Cellosolve"). A mixture consisting of 2 moles (322 g.) of 3,4-dichlorotoluene, 3 moles (354 g.) of the butoxyethanol, 3.3 moles (185 g.) of potassium hydroxide and 100 ml. of toluene was heated with stirring at a temperature of from 164–167° C. for about 8 hours. During this time 74 ml. of water was collected in a take-off head attached to a column with which the reaction vessel was equipped. At the end of the heating period 1500 ml. of water was added to the reaction mixture and the whole was acidified with 85 ml. of concentrated hydrochloric acid and filtered. The organic layer which formed in the filtrate was separated and washed with water. After removing the water by heating to 95° C./25–30 mm. the residue was distilled to give 314 g. of the substantially pure butoxyethyl ar-chlorotolyl ether B.P. 175–195° C./20–25 mm. and analyzing as follows:

|  | Found | Calcd. for $C_{13}H_{19}O_2Cl$ |
|---|---|---|
| Percent C | 64.49 | 64.32 |
| Percent H | 8.07 | 7.89 |
| Percent Cl | 13.88 | 14.61 |

EXAMPLE 7

A mixture consisting of 4 moles (472 g.) of 2-butoxyethanol, 2 moles (556.82 g.) of ar-ethylpentachlorobenzene, 2.5 moles (100 g.) of sodium hydroxide and 100 ml. of toluene was heated with stirring at a temperature of up to 150° C. for 2 hours, during which time 45 ml. of water of reaction was collected, and then heated for 5 more hours at a temperature of 170° C. The whole was then cooled to 80° C., diluted with 500 ml. of water and neutralized with hydrochloric acid. It was then diluted with ether and the organic layer which formed was separated, made alkaline, and washed to neutral. Distillation of the washed material gave 590 g. of (I) 2-butoxyethyl ethyl-ar-tetrachlorophenyl ether B.P. 170–80° C./0.7 mm. $n_D^{25}$ 1.5324 analyzing as shown below and (II) 61 g. of ar-bis(2-butoxyethoxy)ethyl-ar-trichlorobenzene B.P. 205–217° C./0.8–1.0 mm. $n_D^{25}$ 1.5072 and analyzing as shown below.

*Analysis—I*

|  | Found | Calcd. for $C_{14}H_{18}Cl_4O_2$ |
|---|---|---|
| Percent C | 47.51 | 46.65 |
| Percent H | 5.28 | 5.02 |
| Percent Cl | 37.56 | 39.5 |

*Analysis—II*

|  | Found | Calcd. for $C_{20}H_{31}Cl_3O_4$ |
|---|---|---|
| Percent C | 53.44 | 54.45 |
| Percent H | 6.91 | 7.03 |
| Percent Cl | 26.15 | 24.16 |

Based on the charged pentachloroethylbenzene there was obtained a 71.6% conversion to the mono-ether and a 6.9% conversion to the di-ether.

Testing of the electrical properties of (I), i.e., 2-butoxyethyl ethyl-ar-tetrachlorophenyl ether gave a volume resistivity value of $50 \times 10^9$ ohm-cm. at 100° C., and the following dielectric constant and power factor values at the frequencies and temperatures shown below:

| Test Frequency | Dielectric Constant | | Power Factor | |
|---|---|---|---|---|
| | 25° C. | 100° C. | 25° C. | 100° C. |
| 10 kc | 5.65 | 4.5 | Percent 0.14 | Percent 0.3 |
| 100 kc | 5.64 | 4.5 | 0.00 | 0.0 |

The low power factors shown above at both the test frequencies and both the test temperatures, together with the volume resistivity value shown above attest to very good stability of the 2-butoxyethyl ethyl-ar-tetrachlorophenyl ether. Paper capacitors prepared by impregnating kraft tissue paper with this ether, interleaving the impregnated tissues between aluminum foil, and rolling the interleaved assembly were useful at temperatures of down to about minus 40° C., which is the solidifying point of (I).

Testing of (II), i.e., the ar-bis(2-butoxyethoxy)-ethyl-ar-trichlorobenzene also gave good results, the dielectric constant of (II) being 5.6 at both 10 kc. and 100 kc. when tested at 25° C. and 4.6 at both 10 kc. and 100 kc. when tested at 100° C. The power factor at 100 kc. was found to be 0.07 at 25° C. and 0.8 at 100° C. Because (II) has a solidifying point which is approximately that of (I), a mixture of (I) and (II) may be employed as the impregnating agent in the manufacture of paper capacitors.

Although the present ethers are particularly useful as impregnating agents for cellulosic materials adapted for use as dielectrics, because of their very good electrical properties their thermal stability and their ability to remain liquid at low temperatures they are of general utility as liquid dielectrics. They are likewise very advantageously employed as functional fluids, e.g., as heat-transfer media and as hydraulic fluids.

Throughout the specification and claims, the prefix ar when used in naming a chemical compound denotes attachment of the radical or element which it precedes at an aromatic ring carbon atom, rather than at an aliphatic carbon. It is employed whenever the exact position on the benzene ring at which the substitution occurs is unknown.

What I claim is:
1. An ether having the formula

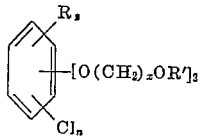

in which R is an alkyl radical of from 1 to 5 carbon atoms, $z$ is an integer of from 0 to 3, R' is an alkyl radical of from 1 to 8 carbon atoms, $x$ is an integer of from 2 to 4, and $n$ is an integer of 1 to 4.

2. An ether of the formula

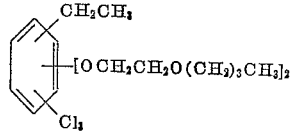

3. A bis(alkoxyalkyloxy) chlorobenzene having from 1 to 5 carbon atoms in the alkoxy radical and from 2 to 4 carbon atoms in the alkyl radical.

References Cited in the file of this patent

UNITED STATES PATENTS

| | | |
|---|---|---|
| 2,178,831 | Bruson | May 7, 1939 |
| 2,205,392 | Coleman et al. | June 25, 1940 |
| 2,291,528 | Bruson et al. | July 28, 1942 |
| 2,416,263 | MacMullen | Feb. 18, 1947 |
| 2,418,820 | Coggins | Apr. 15, 1947 |
| 2,450,272 | Doelling et al. | Sept. 28, 1948 |
| 2,456,381 | Clark | Dec. 14, 1948 |
| 2,527,506 | Doelling | Oct. 24, 1950 |
| 2,535,690 | Miller | Dec. 26, 1950 |
| 2,615,823 | Lawlor et al. | Oct. 28, 1952 |
| 2,711,498 | Robinson | June 21, 1955 |

FOREIGN PATENTS

| | | |
|---|---|---|
| 882,404 | Germany | July 9, 1953 |